No. 702,366. Patented June 10, 1902.
C. B. JOHNSON.
GATE.
(Application filed Nov. 4, 1901.)
(No Model.)
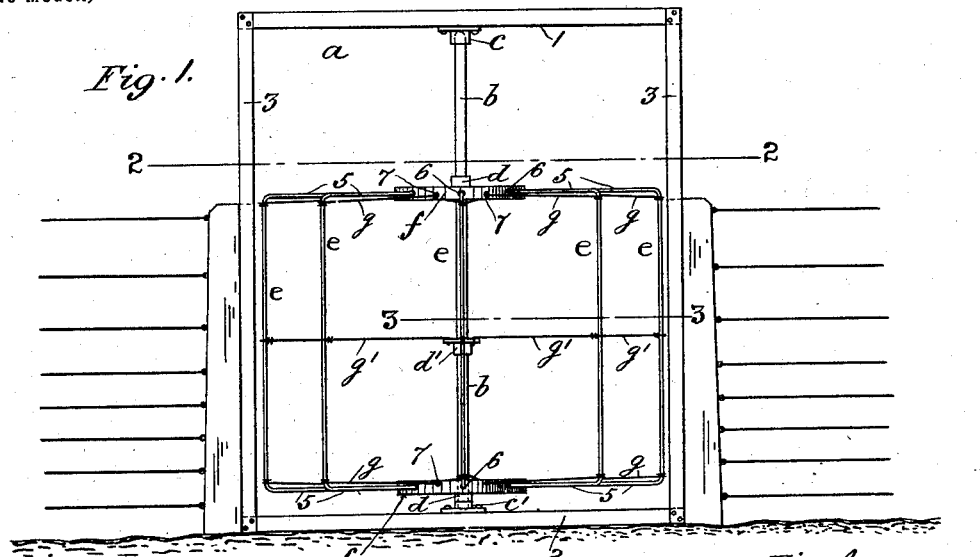
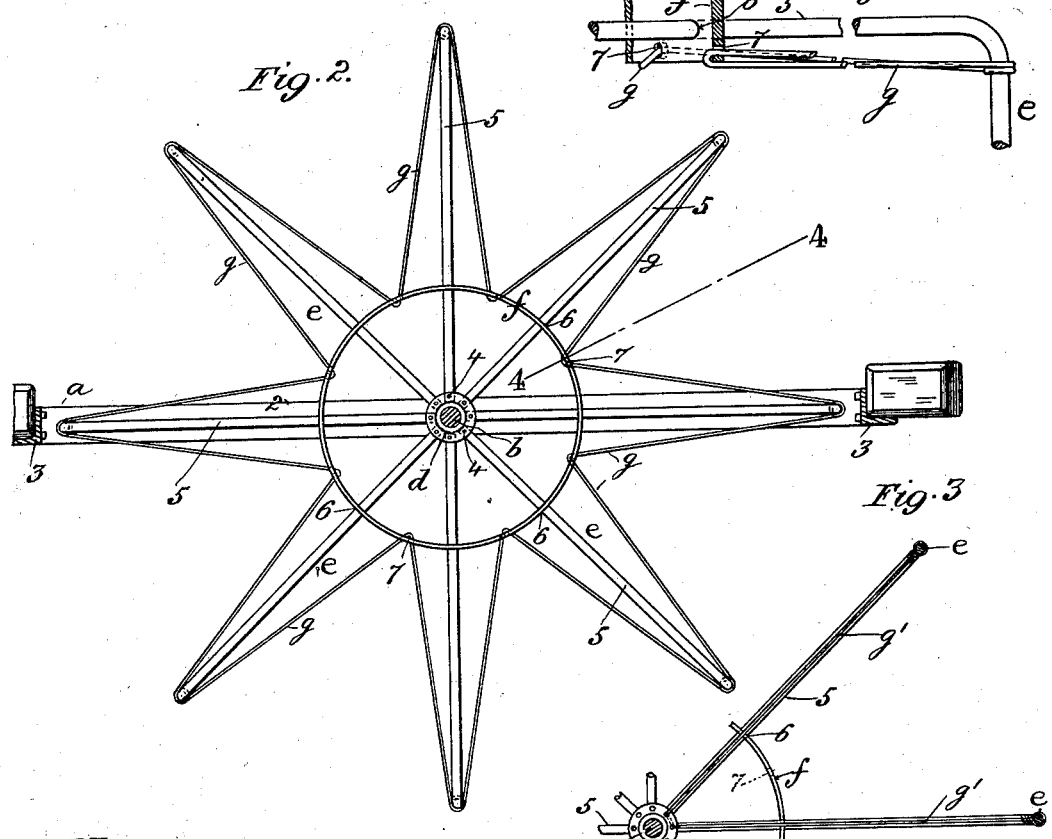
WITNESSES
INVENTOR
Charles B Johnson
By Edward W Furrell
His Atty

UNITED STATES PATENT OFFICE.

CHARLES B. JOHNSON, OF GRAPEVINE, TEXAS.

GATE.

SPECIFICATION forming part of Letters Patent No. 702,366, dated June 10, 1902.

Application filed November 4, 1901. Serial No. 81,090. (No model.)

*To all whom it may concern:*

Be it known that I, CHARLES B. JOHNSON, a citizen of the United States, residing at Grapevine, in the county of Tarrant and State of Texas, have invented a new and useful Improvement in Gates, of which the following is a specification.

My invention relates to that class of gate known as a "turnstile" or "revolving" gate, and has for its object to provide a simple and inexpensive gate especially adapted for farms, parks, and the like.

The invention consists in features of novelty, as hereinafter described and claimed, reference being had to the accompanying drawings, forming part of this specification, whereon—

Figure 1 is a front elevation of my improved gate; Fig. 2, a horizontal section, to enlarged scale, through the gate on line 2 2 in Fig. 1; Fig. 3, a similar view to Fig. 2 on line 3 3 in Fig. 1 through the gate, broken away; and Fig. 4, a cross-section, to enlarged scale, on line 4 4 in Fig. 2, through a part of the gate, showing one of the arms broken away and wire bracing therefor forming parts of the invention.

Like letters and numerals denote like parts in all the figures.

My improved gate consists of an upright frame $a$, having the top and bottom sills 1 2, respectively, and the side posts 3, composed, preferably, of angle-irons or other sectional bars riveted together at the corners of the frame $a$, or the frame $a$ may be made of wood.

In the frame $a$, midway between the side posts 3, is an upright shaft or spindle $b$, which is mounted at its ends and adapted to revolve in bearings $c$ $c'$, fixed to the top and bottom sills 1 2, respectively.

On the shaft $b$, at a suitable distance from each other and from the sills 1 and 2, respectively, are fixed, preferably, two circular hubs or disks $d$, one above the other, in the peripheries of which are secured, by pins 4 or otherwise, the ends of the horizontal upper and lower legs 5, respectively, of preferably staple-shaped rods $e$, which radiate from the shaft $b$ to equal distances therefrom and at equal distances apart around the same, each rod $e$ thus formed constituting an arm of the gate and hereinafter referred to as such.

Concentric with the shaft $b$ and with each disk $d$ is a preferably flat circular band $f$, of suitable diameter, through which transversely are holes 6, corresponding in diameter and distance apart to the legs 5, which pass through and tightly fit within the holes 6, and are thereby held firmly at their proper distance apart around the shaft $b$.

To the outer part of one of the arms $e$ is fixed a wire $g$, which preferably passes therefrom at an angle through a hole 7, formed in the band $f$ midway between the hole 6 of the said arm and the hole 6 of the succeeding arm $e$, to the outer part of which the wire $g$ extends and is secured, and so on throughout the entire series of holes 7 and arms $e$, which are thereby securely braced laterally to the bands $f$. Similar wire braces $g'$ are fixed to the outer parts of the arms $e$ and to a corresponding hub or disk $d'$ on the shaft $b$, preferably midway between the legs 5 and disks $d$, as shown.

My improved gate is particularly adapted for farm use, being simple, cheap, and durable. It has no locking or raising and lowering contrivances, and a person entering the space between any two of its arms $e$ can by revolving the arms $e$ and shaft $b$ pass freely through the gate, while its construction prevents the straying therethrough of cattle into or from the inclosure.

What I claim as my invention, and desire to secure by Letters Patent, is—

1. In a gate of the class described, the combination of a frame, an upright shaft having its ends journaled in bearings formed in or attached to the frame, arms radiating from and fixed by hubs to the shaft, a band held to the arms concentrically with the shaft, and wire connecting the arms to the said band, substantially as described.

2. In a gate of the class described, the combination of a frame, an upright shaft having its ends journaled in bearings formed in or attached to the frame, arms radiating from and fixed to the shaft, and a band held to the arms concentrically with the shaft, substantially as described.

3. As an improved article of manufacture in a gate of the class described a shaft having its ends journaled in bearings, and having staple-shaped or analogous rods radiating therefrom, a band held to the said rods, and wire connecting the rods to the said band, substantially as described.

In testimony whereof I have signed my name to this specification in the presence of two subscribing witnesses.

CHARLES B. JOHNSON.

Witnesses:
B. R. WALL,
E. L. FORTUNE.